(12) United States Patent
Natsume (10) Patent No.: US 6,657,393 B2
(45) Date of Patent: Dec. 2, 2003

(54) VEHICLE LAMP HAVING LIGHT SOURCES WITH LEDS ARRANGED IN TWO GROUPS

(75) Inventor: Kazunori Natsume, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 122 days.

(21) Appl. No.: 09/953,887

(22) Filed: Sep. 18, 2001

(65) Prior Publication Data

US 2002/0053878 A1 May 9, 2002

(30) Foreign Application Priority Data

Sep. 18, 2000 (JP) ........................... 2000-281899

(51) Int. Cl.[7] .................... B60Q 1/02; H01L 27/14

(52) U.S. Cl. .................. 315/82; 315/77; 315/83; 315/200 A; 315/185 S; 362/800; 362/812; 362/803

(58) Field of Search ............... 315/82, 77, 83, 315/76, 312, 324, 316, 314, 185 S, 200 A; 362/800–802, 806, 812

(56) References Cited

U.S. PATENT DOCUMENTS

| | | | | |
|---|---|---|---|---|
| 5,359,326 A | * | 10/1994 | Bivens et al. | 340/971 |
| 5,457,450 A | * | 10/1995 | Deese et al. | 340/912 |
| 5,580,156 A | | 12/1996 | Suzuki et al. | 362/184 |
| 5,678,335 A | | 10/1997 | Gomi et al. | 40/550 |
| 5,746,497 A | | 5/1998 | Machida | 362/80 |
| 5,747,940 A | * | 5/1998 | Openiano | 315/185 S |
| 5,954,424 A | * | 9/1999 | Anderson et al. | 362/242 |
| 6,038,387 A | | 3/2000 | Machida | 395/500.23 |
| 6,286,976 B1 | * | 9/2001 | Chopra et al. | 362/183 |
| 6,357,893 B1 | * | 3/2002 | Belliveau | 362/285 |

* cited by examiner

*Primary Examiner*—Don Wong
*Assistant Examiner*—Tuyet T. Vo
(74) *Attorney, Agent, or Firm*—Sughrue Mion, PLLC (57) ABSTRACT

A vehicle lamp has light sources having light emitting diodes that are vertically and horizontally disposed in the form of a square. A first LED group is disposed in the central position of the light source and is turned on in the tail lamp lighting mode. A second LED group surrounds the first LED group, and is turned on together with the first LED group in the stop lamp lighting mode. Thus, the light source appears as if the LEDs became luminous around the central position of the light source in any lamp lighting mode.

20 Claims, 9 Drawing Sheets

VEHICLE LAMP HAVING LIGHT SOURCES WITH LEDS ARRANGED IN TWO GROUPS

BACKGROUND OF THE INVENTION

1. Technical Field of the Invention

The present invention relates to a vehicle lamp having a light source comprising a plurality of LEDs (light emitting diodes) which can be turned on in switchable lamp lighting modes.

2. Prior Art

Conventional vehicle lamps, such as tail and stop lamps, have been constructed so that they can be turned on in two kinds of lamp lighting modes. A specific arrangement for accomplishing the purpose is to use double-filament light sources, whereby to switch lighting modes of tail and stop lamps, the number of filaments to be heated is changed.

There are also known vehicle lamps that use a plurality of LEDs as light sources, wherein the lighting modes of tail and stop lamps are switched by properly changing the number of LEDs to be turned on.

In case where the number of LEDs to be turned on in such a vehicle lamp is changed casually, the number of light sources looks as if the number thereof were increased or decreased and the position of each light source looks as if the position thereof were varied at the time of switching the lamp lighting modes. Consequently, it is feared that drivers of other vehicles are given an incorrect indication.

BRIEF SUMMARY OF THE INVENTION

Accordingly, it is an object of the present invention to provide a vehicle lamp wherein it is possible to switch lamp lighting modes without giving drivers of other vehicles an incorrect indication even when each light source is formed with a plurality of LEDs.

The present invention is intended to achieve the object described above, and in order to accomplish the object above, predetermined groups of lenses are disposed in front of a plurality of LEDs.

A vehicle lamp according to the present invention comprises a light source having a plurality of LEDs that can be turned on in at least two kinds of lamp lighting modes. The light source is provided with a first LED group comprising at least one LED disposed in the substantially central position of the light source, and a second LED group comprising a plurality of LEDs so disposed as to surround the first LED group. The lamp lighting modes include a first lamp lighting mode wherein only the first LED group is turned on and a second lamp lighting mode wherein the second LED group is turned on.

As long as the vehicle lamp is provided with the light source having the plurality of LEDs, the arrangement of other members that form the lighting device is not limited to any specific arrangement.

As long as the first LED group is disposed in the substantially central position of the light source, the arrangement of the plurality of LEDs forming the first LED group is not limited to any specific arrangement. As long as the second LED group is so disposed as to surround the first LED group, the arrangement of the plurality of LEDs forming the second LED group is not limited to any specific arrangement. For example, arrangements of LEDs forming the first LED group or the second LED group can include a point symmetric arrangement with respect to the central position of the light source or an axial symmetric arrangement with respect to a straight line passing the central position of the light source.

In addition, LEDs forming the first LED group and LEDs forming the second LED group may have the same luminescent color or different luminescent colors.

Although the second LED group is arranged to be turned on in the second lamp lighting mode, turning on the second LED group can include a mode wherein only the second LED group is turned on, and a mode wherein the first LED group together with the second LED group is turned on.

With the arrangement shown above, the vehicle lamp is provided with the light source having the plurality of LEDs which can be turned on in at least two kinds of lamp lighting modes. The light source is provided with the first LED group comprising at least one LED disposed in the substantially central position of the light source and the second LED group comprising the plurality of LEDs so disposed as to surround the first LED group. Moreover, the lamp lighting modes include the first lamp lighting mode wherein only the first LED group is turned on and the second lamp lighting mode wherein the second LED group is turned on, so that the following operation is obtainable.

Specifically, since the first LED group includes at least one LED disposed in the substantially central position of the light source and the second LED group includes the plurality of LEDs so disposed as to surround the first LED group, it is possible to make the light source look as if the light source were turned on around its substantially central position in any one of the following cases: (1) only the first LED group is turned on; (2) only the second LED group is turned on; and (3) where the first LED group and the second LED group are simultaneously turned on.

Therefore, the number of light sources is prevented from appearing as if the number thereof were increased or decreased and the position of the light source is also prevented from appearing as if the position thereof were varied at the time of switching the lamp lighting modes, whereby there is little fear of giving drivers of other vehicles an incorrect indication.

In the vehicle lamp having the light source comprising the plurality of LEDs which are turned on in switchable lamp light modes, it is possible to switch the lamp lighting modes without giving drivers of other vehicles an incorrect indication.

Although the light source may be provided only with the first LED group and the second LED group, the light source may also be provided with a third LED group comprising a plurality of LEDs so disposed as to surround the second LED group. In this case, still more lamp lighting modes can be set up.

With the arrangement above, in case where the first LED group and the second LED group are formed with LEDs having the same luminescent color, the brightness can be varied greatly at the time of switching the lamp lighting modes by lighting the first LED group and the second LED group simultaneously. When the stop lamp is turned on while the tail lamp is kept lighted, drivers of other vehicles and so forth can be made to clearly recognize the lighting of the stop lamp by, for example, forming the first LED group and the second LED group with red LEDs, making the first lamp lighting mode the tail lamp lighting mode and making the second lamp lighting mode the stop lamp lighting mode.

With the arrangement above, on the other hand, in case where the first LED group and the second LED group are formed with LEDs having luminescent colors different from each other, only the second LED group is lighted in the second lamp lighting mode. Consequently, one light source is prevented from being simultaneously lighted with two kinds of luminescent colors, whereby it is possible to switch the lamp lighting modes without giving an incorrect indication to drivers of other vehicles.

When a direction indicator is actuated, an amber turn-signal lamp can be turned on by, for example, forming the first LED group with the red LED and forming the second LED group with amber LEDs, and making the first lamp lighting mode the tail lamp lighting mode and making the second lamp lighting mode the turn-signal lamp lighting mode.

With the arrangement above, provision of a diffusion lens having a plurality of diffusion lens elements in front of the light source can make the luminosity of the whole light source look substantially uniform. Thus, the light source looks more like a single light source.

In this case, provision of a condenser lens in front of the diffusion lens allows required luminous intensity distribution performance of the lighting device to be obtained from the combination of the condenser lens and the diffusion lens.

The light source may be a single light source. However, a sufficient quantity of light can be secured by providing a plurality of light sources in position. In the present invention, a predetermined arrangement of light sources is not particularly limited to a specific arrangement, and the arrangement may be a series arrangement, an annular arrangement or any other type of suitable arrangement.

Moreover, it is possible to adopt a vehicle lamp having a plurality of lamp units by defining the aforementioned vehicle lamp as one lamp unit. In this case, the at least two kinds of lamp lighting modes of each lamp unit are combined to set different combinations between the lamp units in order to make the setting of still more lamp lighting modes feasible.

BRIEF DESCRIPTION OF THE DRAWINGS

The accompanying drawings, which are incorporated in and constitute a part of this specification, illustrate the present invention and, together with the written description, serve to explain the aspects, advantages and principles of the present invention. In the drawings.

DETAILED DESCRIPTION OF THE INVENTION

Referring now to the drawings, an embodiment of the present invention will be described.

Figure 1:
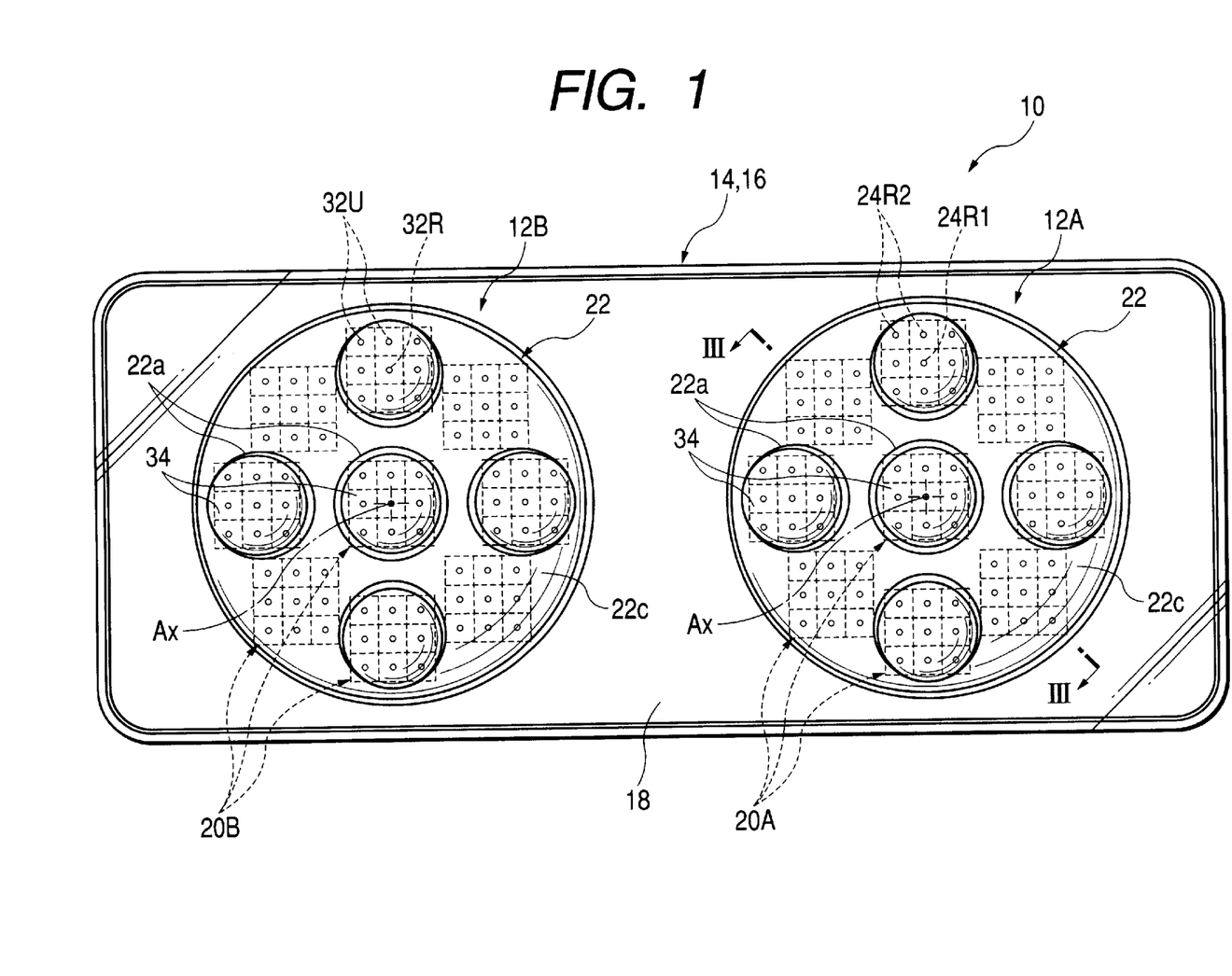
FIG. 1 is an elevation view of a vehicle lamp according to an embodiment of the present invention.
Figure 2:
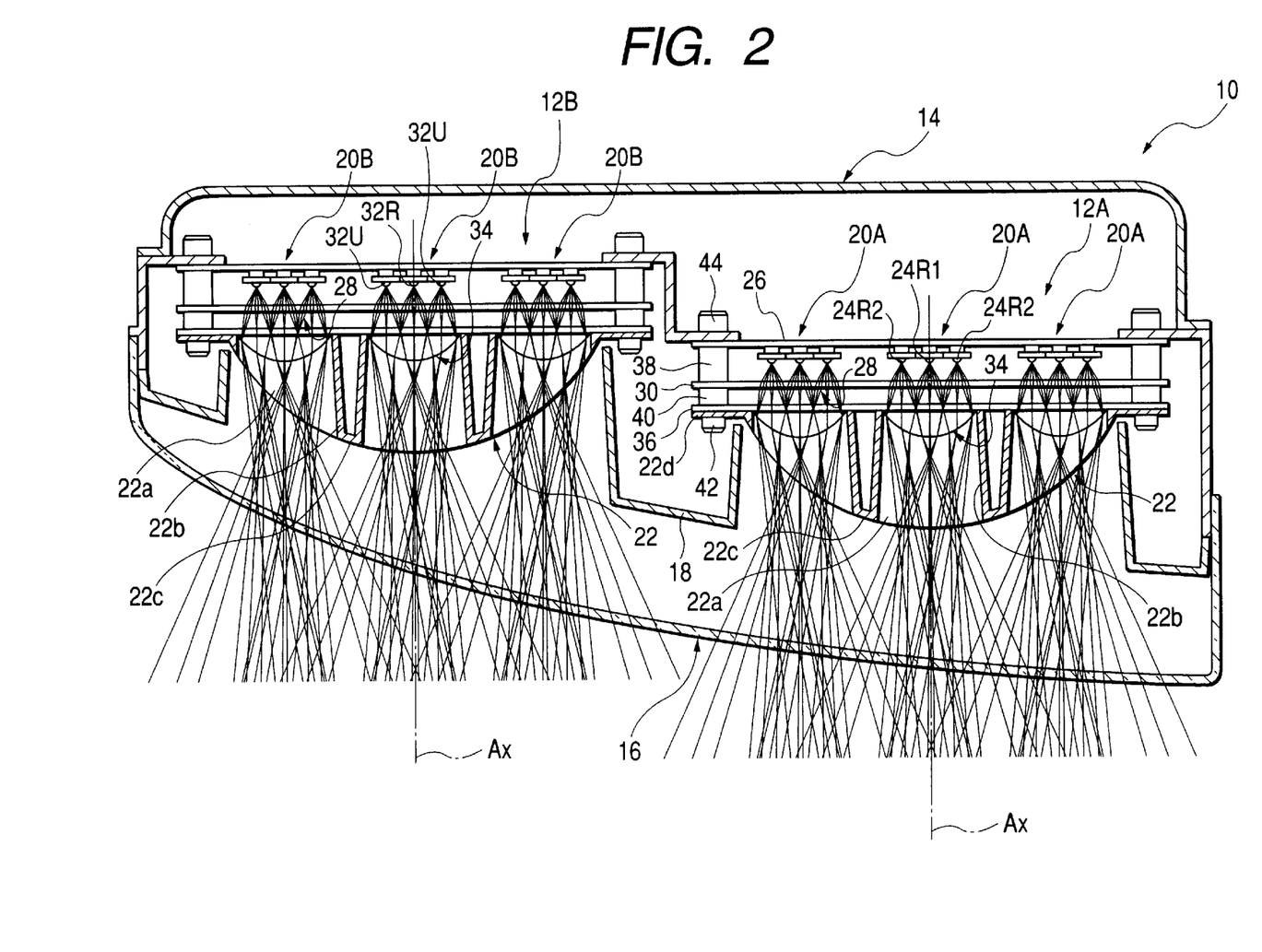
FIG. 2 is a horizontal sectional view of a vehicle lamp according to an embodiment of the present invention.
Figure 3:
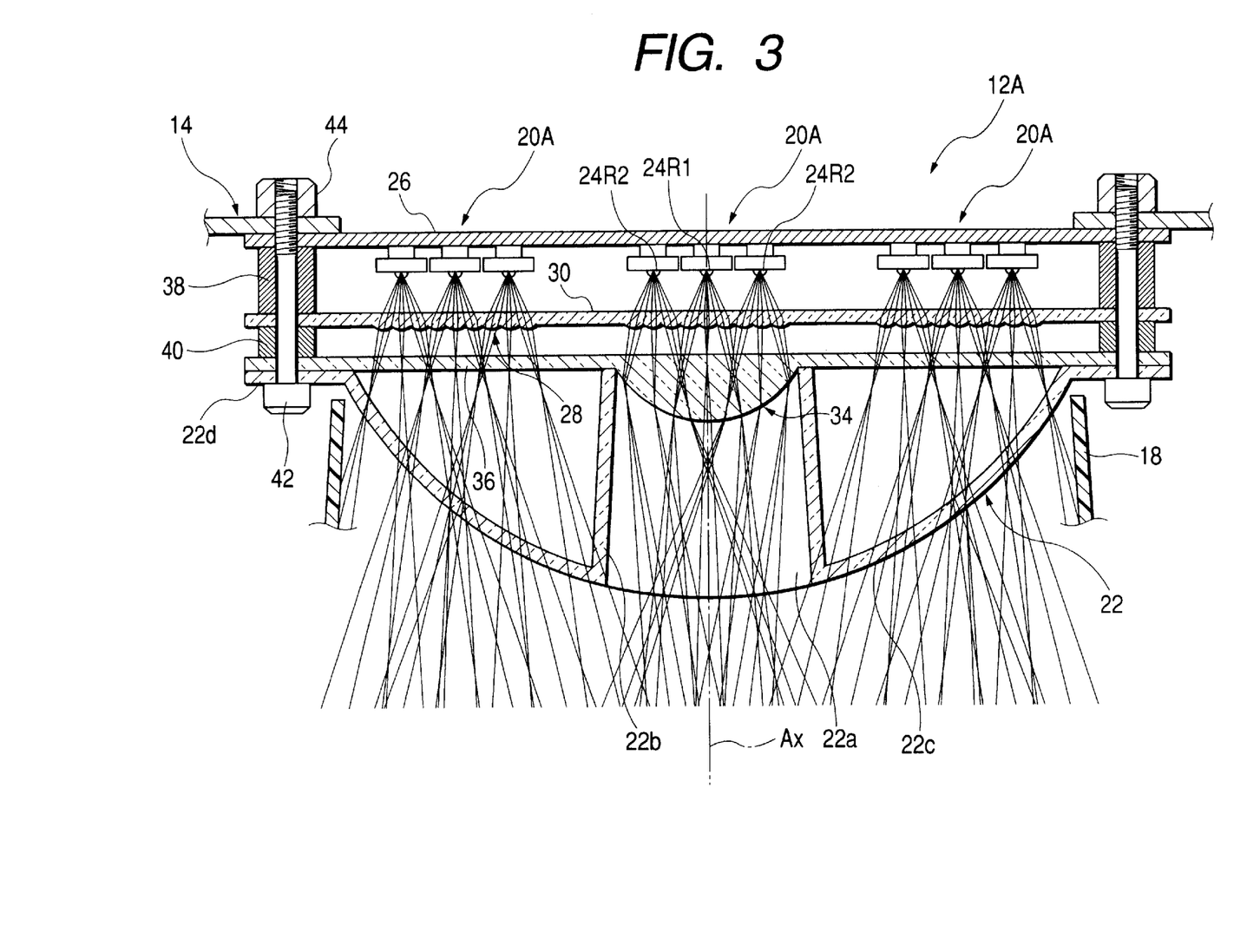
FIG. 3 is a detailed sectional view taken on line III—III of FIG. 1.

FIG. 1 is an elevation view of a vehicle lamp 10 embodying the invention, FIG. 2 a horizontal sectional view thereof, and FIG. 3 a detailed sectional view taken on line III—III of FIG. 1.

As shown in FIGS. 1–3, the vehicle lamp 10 according to the present invention is a rear combination lamp installed in the left-side rear end portion of a vehicle.

The vehicle lamp 10 includes a pair of lamp units 12A and 12B contained in a lamp chamber. The lamp chamber comprises a lamp body 14 having a contour that is long sideways, a plain translucent cover 16, and a shielding panel 18 surrounding these lamp units 12A and 12B.

The vehicle lamp 10 functionally serves as a tail lamp, a stop lamp and a turn-signal lamp. Specifically, the lamp unit 12A positioned on the inner side of the vehicle in the width direction thereof can be turned on in a tail lamp lighting mode and a stop lamp lighting mode. The lamp unit 12B positioned on the outer side of the vehicle in the width direction thereof can be turned on in the tail lamp lighting mode and a turn-signal lamp lighting mode.

The construction of the lamp unit 12A will be described first.

The lamp unit 12A is provided with nine light sources 20A and a translucent panel 22 provided in front of these light sources 20A (i.e., provided in front of the lighting device but practically situated in the rear of the vehicle; the same will also apply to the following).

Each of the light sources 20A comprises of nine red LEDs 24R1 and 24R2 such the red LEDs are vertically and horizontally disposed in the form of a square, i.e., a 3×3 square. Of the nine red LEDs 24R1 and 24R2, one red LED 24R1 (a first LED group) disposed in the central position of the light source 20A is turned on in the tail lamp lighting mode. The eight red LEDs 24R2 (a second LED group) surrounding the red LED 24R1 are turned on together with the red LED 24R1 in the stop lamp lighting mode.

One of the nine light sources 20A is disposed on an optical axis Ax extending in a longitudinal direction passing through the central position of the lamp unit 12A. The remaining eight light sources are disposed so as to surround the optical axis Ax at 45° intervals on the same circumference.

Referring to FIG. 2, the nine red LEDs 24R1 and 24R2 forming each of the nine light sources 20A are mounted on a single printed board 26. A diffusion lens 28 having a plurality of diffusion lens elements (fish-eye lenses) is provided in front of each light source 20A. These diffusion lenses 28 are formed on a single diffusion lens board 30.

Referring to FIG. 3, with respect to the light source 20A positioned on the optical axis Ax and four of the light sources 20A positioned in the vertical and horizontal directions of the light source 20A positioned on the optical axis Ax (five of the cross-shaped light sources 20A), condenser lenses 34 are further provided in front of the diffusion lenses 28. As described above, the diffusion lenses 28 are provided in front of the respective light sources 20A. Each of these condenser lenses 34 is formed with a planoconvex lens having a convex surface on the front side and formed on a single condenser lens board 36.

The translucent panel 22 is dome-shaped and protruded forward. In the front portion of each of the cross-shaped five light sources 20A in the translucent panel 22, a circular opening portion 22a slightly greater in diameter than the condenser lens 34 in the elevation view of the lighting device is formed. A cylindrical portion 22b towards the condenser lens board 36 while maintaining the substantially outer peripheral configuration of the opening portion 22a is formed in the opening portion 22a. Further, half-mirror processing is applied to the dome-shaped surface of the translucent panel 22 to form a half mirror portion 22c. The half-mirror processing is also applied to the surface of the cylindrical portion 22b in the translucent panel 22.

The translucent panel 22 has an outer peripheral portion formed as an annular flat portion 22d. The annular flat portion 22d, the printed board 26, the diffusion lens board 30 and the condenser lens board 36 via spacers 38 and 40, are fixed to the lamp body 14 with bolts 42 and nuts 44 in several peripheral places of the annular flat portion 22d.

In this lamp unit 12A, light emission is carried out as follows.

As far as the cross-shaped five light sources 20A are concerned, light from the red LEDs 24R1 and 24R2 forming the light source 20A is diffused through the diffusion lens 28. The condenser lens 34 concentrates the diffused light, and then emits it forward. On the other hand, with respect to the other four remaining light sources 20A, light from red LEDs 24R1 and 24R2 that form each of the four light sources is diffused through the diffusion lens 28. The light emitted from the diffusion lens 28 passes through the translucent panel 22 before being emitted forward. Thus, the required luminous intensity distribution of the lighting device can be secured.

The construction of the lamp unit 12B will now be described.

Referring to FIG. 1, the construction of the lamp unit 12B is basically similar to that of the lamp unit 12A but different in LEDs forming the 20B from the lamp unit 12A.

Specifically, the lamp unit 12B is also provided with nine light sources 20B, each of which comprises nine LEDs vertically and horizontally disposed, i.e., a 3×3 square. One LED disposed in the central position of the light source 20B is a red LED 32R and eight LEDs surrounding the red LED 32R are amber LEDs 32U. Further, in each light source 20B, the one red LED 32R (a first LED group) is turned on in the tail lamp lighting mode. The eight amber LEDs 32U (a second LED group) are turned on in the turn-signal lamp lighting mode.

FIGS. 4 to 7 are elevation views of a condition in which the vehicle lamp 10 according to this embodiment of the invention is turned on in various lamp lighting modes.

Figure 4:
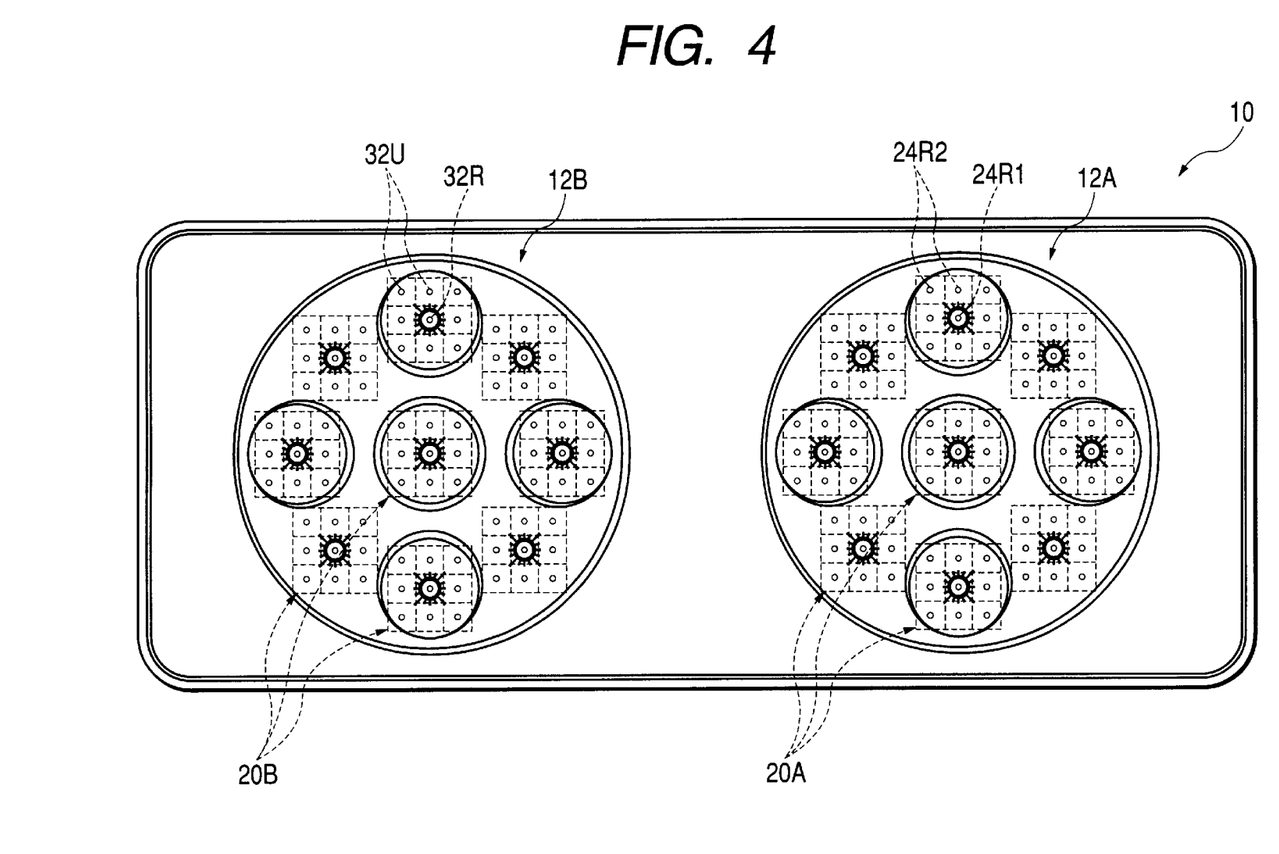
FIG. 4 is an elevation view showing a condition in which the vehicle lamp is turned on in a tail lamp lighting mode.

As shown in FIG. 4, only the red LEDs 24R1 and 32R positioned in the centers of the respective light sources 20A and 20B of both lamp units 12A and 12B are turned on in the tail lamp lighting mode. Thus, both the lamp units 12A and 12B of the vehicle lamp 10 are turned red and function as tail lamps.

Figure 5:
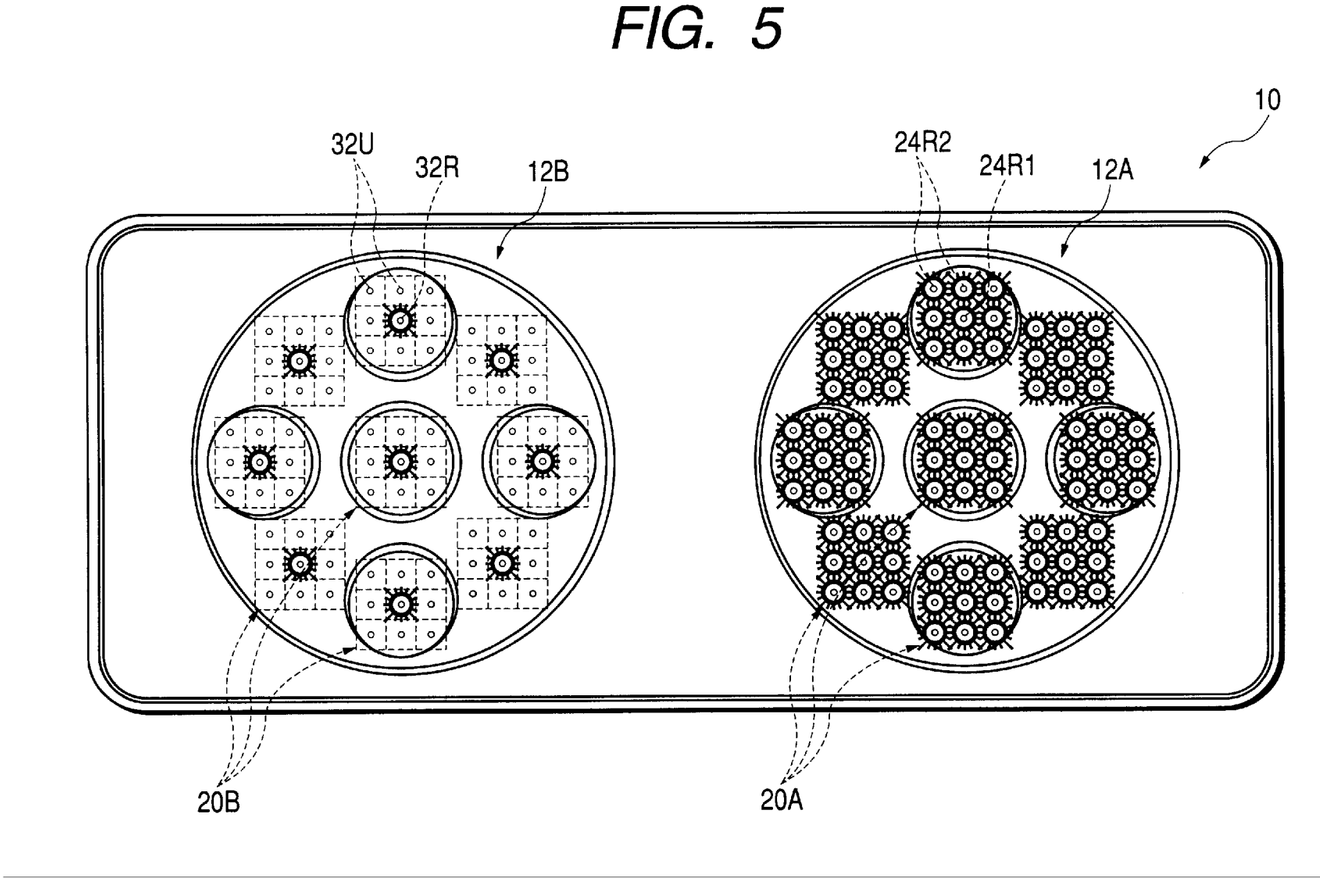
FIG. 5 is an elevation view showing a condition in which the vehicle lamp is turned on in a tail-stop lamp lighting mode.

As shown in FIG. 5, in the tail-stop lamp lighting mode, the stop lamp is turned on while the tail lamp is kept lighted. For lamp unit 12B, each of the light sources 20B remains unoperated with respect to the tail-stop lamp lighting mode while the tail lamp is kept lighted. For lamp unit 12A, the eight red LEDs 24R2 positioned around the red LED 24R1 in each of the light sources 20A are turned on, along with red LED 24R1. When the eight red LEDs 24R2 are turned on in the tail-stop lamp lighting mode, the lamp unit 12A is far brighter than that in the tail lamp lighting mode. Thus, the vehicle lamp 10 fulfills the functions of the tail and stop lamps, as the lamp unit 12A is turned on in the stop lamp lighting mode while the lamp unit 12B maintains the tail lamp lighting mode.

Incidentally, when the eight red LEDs 24R2 in each of the light sources 20A of the lamp unit 12A are turned on, the luminescent area and brightness centering on the central position of the light source 20A appear as if the luminescent area and brightness became greater. This is due to the fact that the red LEDs 24R2 are disposed in such a manner as to surround the red LED 24R1. Therefore, the number of light sources will not appear to increase or decrease nor will the position of any one of the light sources appear to vary.

Figure 6:
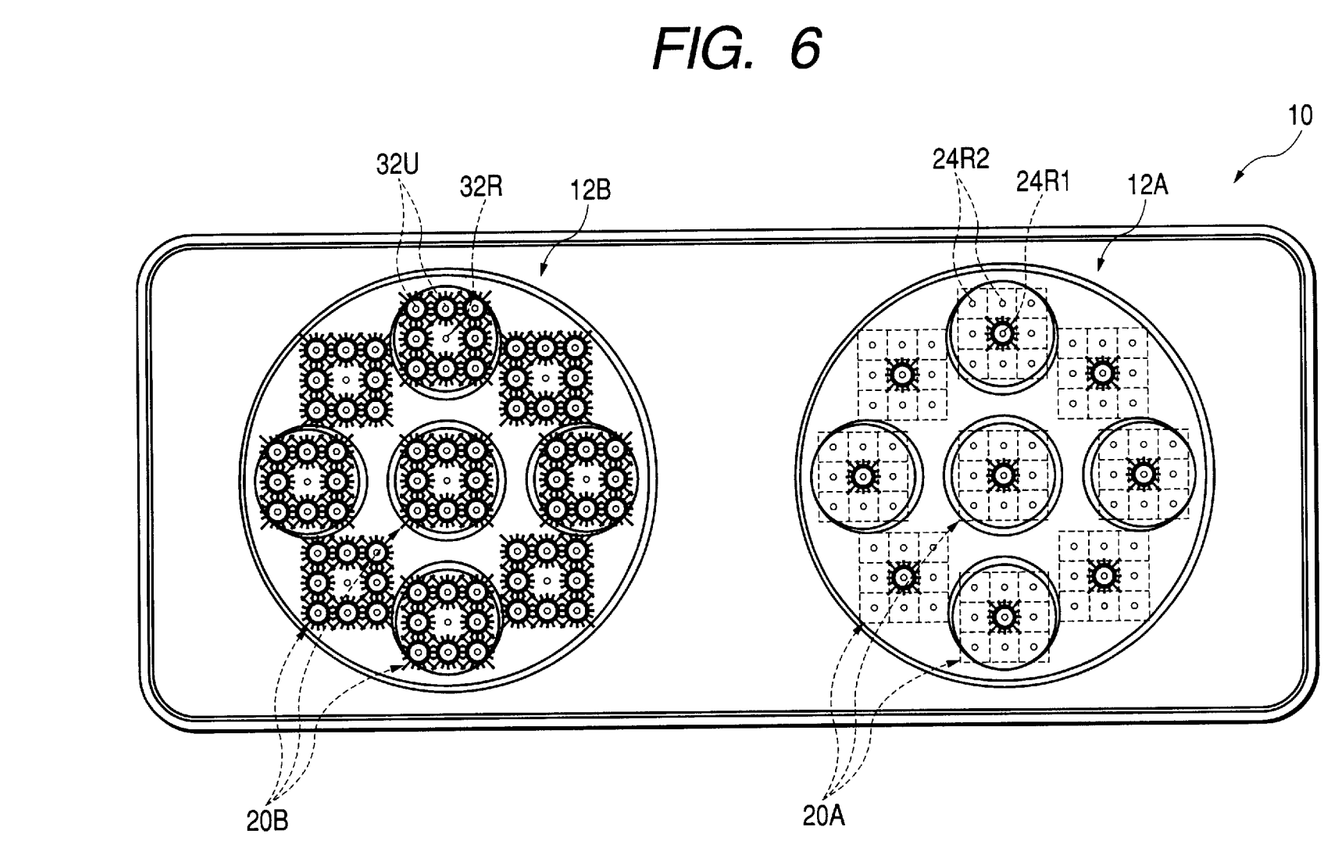
FIG. 6 is an elevation view showing a condition in which the vehicle lamp is turned on in a tail and turn-signal lamp lighting mode.

As shown in FIG. 6, each of the light sources 20A of the lamp unit 12A remains unoperated with respect to the tail lamp lighting mode in the tail and turn-signal lamp lighting mode. The turn-signal lamp is turned on while the tail lamp is kept lighted in the tail and turn-signal lamp lighting mode. In the lamp unit 12B, the red LED 32R disposed in the central position of each light source 20B is turned off, and the eight amber LEDs 32U positioned around the red LED 32R are intermittently turned on. Thus, the vehicle lamp 10 fulfills the functions of the tail and turn-signal lamps as the lamp unit 12B is turned on in the turn-signal lamp lighting mode while the lamp unit 12A maintains the tail lamp lighting mode.

In the lamp unit 12B, even though the red LED 32R is switched off and the eight amber LEDs 32U are switched on in each light source 20B, the luminescent color centering on the central position of the light source 20B varies. The luminescent area and brightness appears to be because the amber LEDs 32U are disposed around the red LED 32R. Therefore, the number of light sources will not appear to increase or decrease, nor will the position of any one of the light sources appear to vary.

Figure 7:
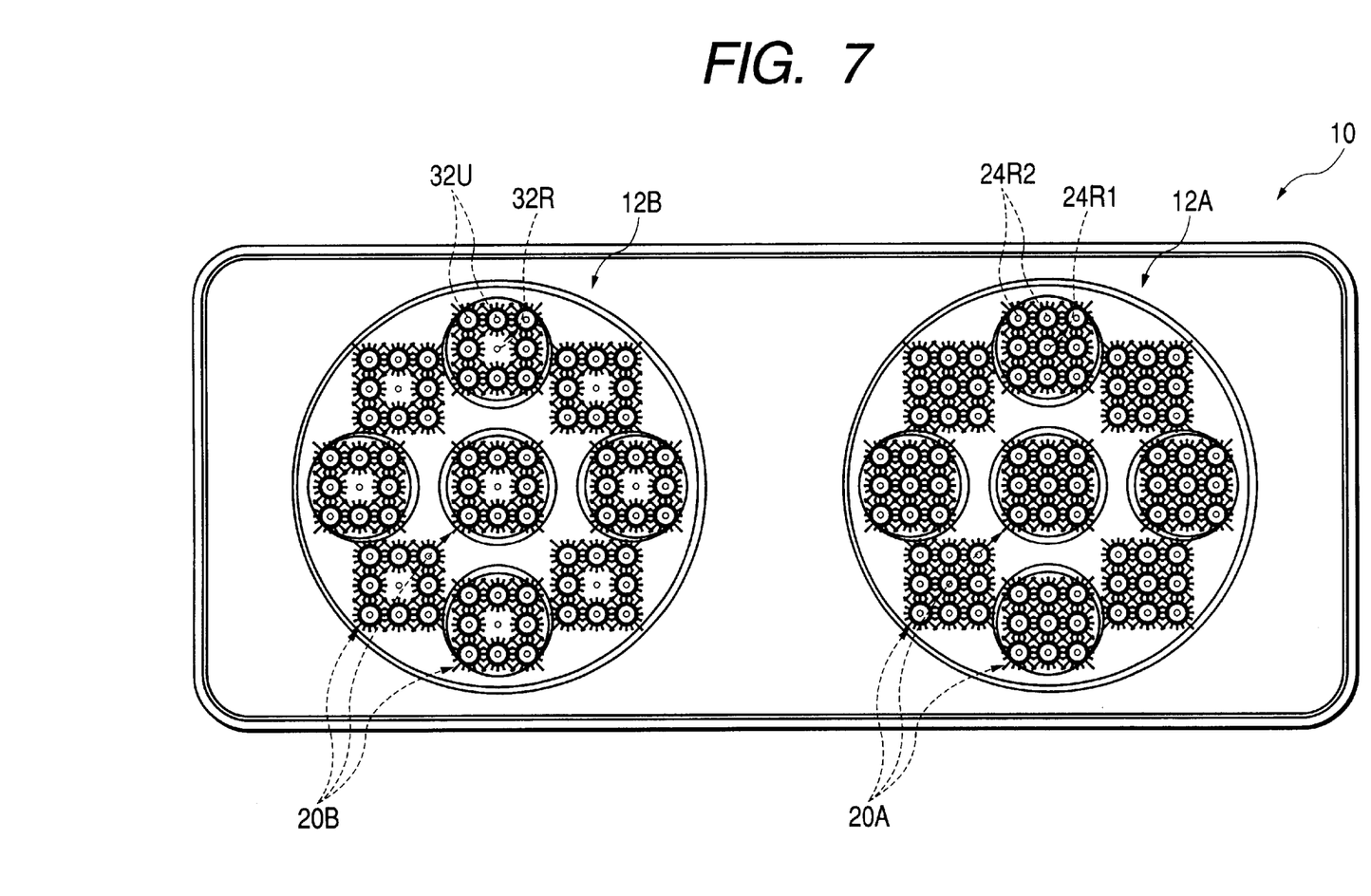
FIG. 7 is an elevation view showing a condition in which the vehicle lamp is turned on in a stop and turn-signal lamp lighting mode.

As shown in FIG. 7, in the stop and turn-signal lamp lighting mode, the turn-signal lamp and a brake lamp are simultaneously turned on. In the lamp unit 12B, the eight amber LEDs 32U disposed around the red LED 32R in each of the light sources 20B is operated, while the red LED 32R is not operated. In lamp unit 12A, the eight red LEDs 24R2 disposed around the red LED 24R1 in each light source 20A, as well as the red LED 24R1, is operated. Thus, the vehicle lamp 10 fulfills the functions of the tail and turn-signal lamps, as the lamp unit 12A is turned on in the stop lamp lighting mode while the lamp unit 12B maintains the turn-signal lamp lighting mode.

As described above in detail, the vehicle lamp 10 according to the present invention is provided with the pair of lamp units 12A and 12B that are turned on in two lamp lighting modes different from each other. Thus, a number of lamp lighting modes can be set by a combination of them.

Moreover, since each of the lamp units 12A and 12B is provided with nine light sources 20A and 20B, a sufficient quantity of light can be secured for each of the lamp units 12A and 12B.

Due to the arrangement of the light sources 20A and 20B of the lamp units 12A and 12B respectively, the LED around the central position of each of the light sources 20A and 20B appears as if the LED became luminous in any lamp lighting mode, the number of light sources is prevented from appearing as if the number thereof were increased or decreased. In addition, the position of each light source is also prevented from appearing as if it varied at the time of switching the lamp lighting modes. Therefore, there is no fear that drivers of other vehicles are given an incorrect indication.

According to this embodiment of the present invention, the red LED 24R1 disposed in the central position of each light source 20A of the lamp unit 12A is turned on in the tail lamp lighting mode. In addition, the red LED 24R1 and the red LEDs 24R2 disposed around the red LED 24R1 are simultaneously turned on in the stop lamp lighting mode. Consequently, the overall brightness can be varied greatly at the time of switching the lamp lighting modes. Thus, when the stop lamp is turned on while the tail lamp is kept lighted, drivers of other vehicles can recognize the lighting of the stop lamp. Further, according to this embodiment of the present invention, the red LED 32R disposed in the central position of each light source 20B of the lamp unit 12B is turned on in the tail lamp lighting mode. In addition, the amber LEDs 32U disposed around the red LED 32R are turned on and the red LED 32R is turned off in the turn-signal lamp lighting mode. Thus, each light source 20B is prevented from being simultaneously lighted with two kinds of luminescent colors, making it is possible to switch the lamp lighting modes without giving an incorrect indication to drivers of other vehicles.

According to this embodiment of the present invention, in each lamp unit 12A and 12B, a diffusion lens 28 having the plurality of diffusion lens elements is provided in front of each of the nine light sources 20A and 20B. Therefore, the luminosity of each of the light sources 20A and 20B appears substantially uniform when each of them is activated. Thus, the light sources 20A and 20B look like a single light source.

Moreover, according to this embodiment of the present invention, a condenser lens 34 is provided in front of each of five light sources out of nine light sources 20A (condenser lenses are provided for light sources 20B). The combination of the condenser lenses 34 and the diffusion lenses 28 allows required luminous intensity distribution performance of the lighting device to be obtained.

In the above-described embodiment of the present invention, the LEDs are vertically and horizontally disposed in each of the light sources 20A and 20B, i.e., a 3×3 square. However, arrangements other than what has been described above may be adopted as shown in exemplary FIGS. 8(a)–(f) and 9(a)–(e). The exemplary arrangements of LEDs in the light sources 20A shown in FIGS. 8(a)–(f) and 9(a)–(e) are applicable to the light sources 20B as well.

The exemplary arrangements of LEDs shown in FIGS. 8(a)–(f) are such that while one red LED 24R1 out of the red LEDs 24R1 and 24R2 constituting the light source 20A is disposed in the center as before, the arrangement of the red LEDs 24R2 disposed around the one red LED 24R1 can be varied.

Figure 8A:
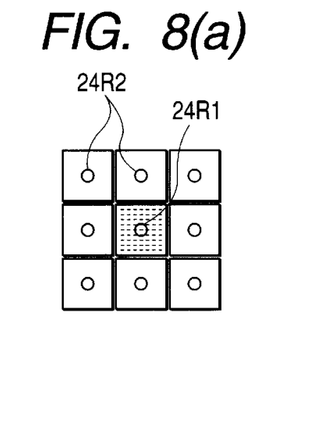
FIGS. 8(a)–(f) are diagrams showing exemplary arrangements of LEDs constituting each light source of the vehicle lamp.
Figure 8B:
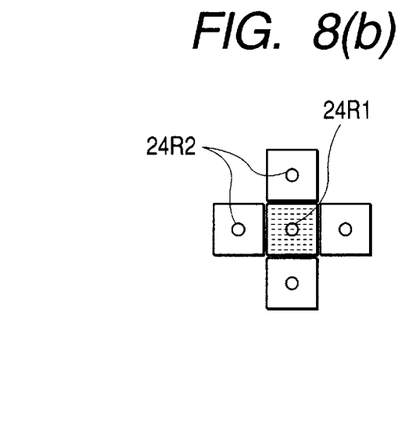
Figure 8C:
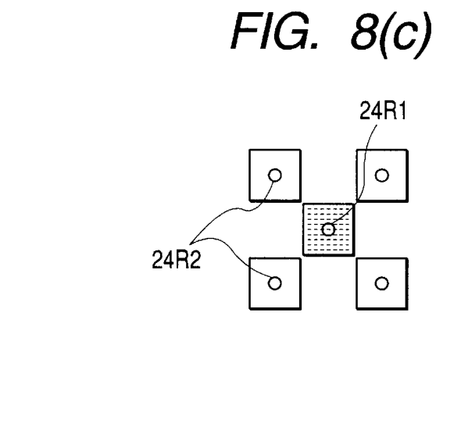
Figure 8D:
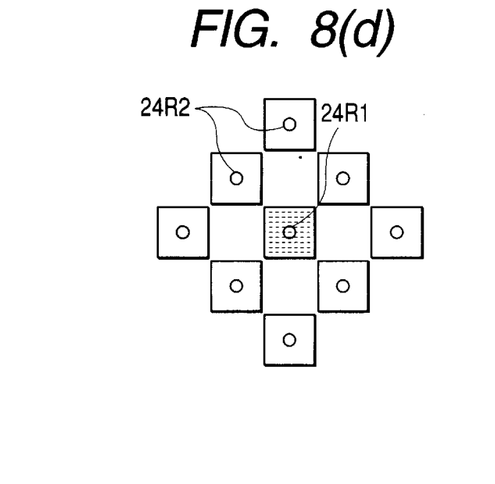
Figure 8E:
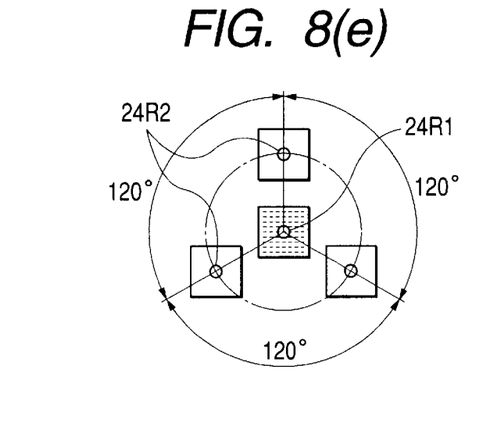
Figure 8F:
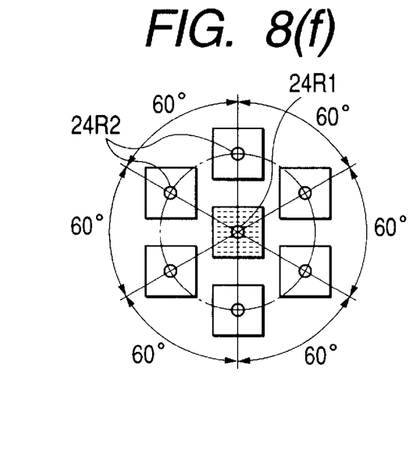

FIG. 8(a) illustrates an embodiment of the present invention where eight red LEDs 24R2 are disposed around the red LED 24R1 in the form of a square. FIG. 8(b) illustrates an embodiment of the present invention where four red LEDs 24R2 disposed at the respective corners are omitted. FIG. 8(c) illustrates an embodiment of the present invention where four red LEDs 24R2 (2 vertical LEDs and 2 horizontal LEDs) are omitted. FIG. 8(d) illustrates an embodiment of the present invention where eight red LEDs 24R2 are disposed diamond-wise and stepwise. FIG. 8(e) illustrates an embodiment of the present invention where three red LEDs 24R2 are disposed at intervals of 120° on the same circumference. FIG. 8(f) illustrates an embodiment of the present invention where six red LEDs 24R2 are disposed at intervals of 60° on the same circumference.

In each one of the exemplary arrangements above, a plurality of red LEDs 24R2 are disposed so as to surround the red LED 24R1 disposed in the center of the light source 20A. Therefore, the light source 20A appears as if a single light source became luminous in any one of the lamp lighting modes wherein only the red LED 24R1 is turned on and wherein the red LEDs 24R1 and 24R2 are turned on (further, in the lamp lighting mode wherein only the red LEDs 24R2 (only the amber LEDs 32U of the light source 20B) are turned on).

Since the plurality of red LEDs 24R2 are disposed with geometric regularity in any one of the exemplary arrangements above, the light source 20A can be turned on as a single light source without giving an incorrect indication. Even if any one of the exemplary arrangements above is made with in a geometric arrangement with some irregularities, it is possible to make the light source 20A look like a single light source to be turned on.

The exemplary arrangements of LEDs shown in FIGS. 9(a)–9(e) are such that the disposition of the red LEDs 24R1 and 24R2 forming the light source 20A are varied.

Figure 9A:
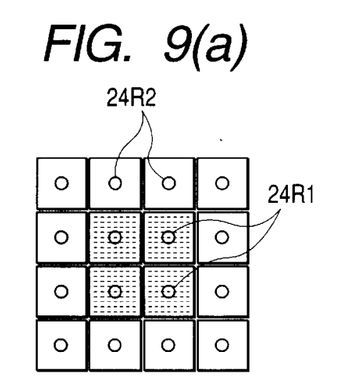
FIGS. 9(a)–(e) are diagrams showing exemplary arrangements of LEDs constituting each light source of the vehicle lamp.
Figure 9B:
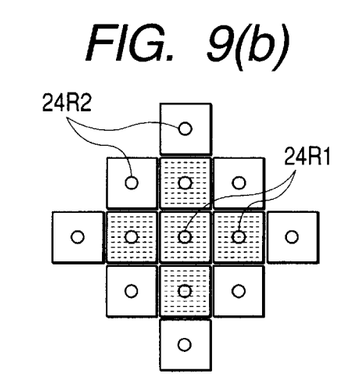
Figure 9C:
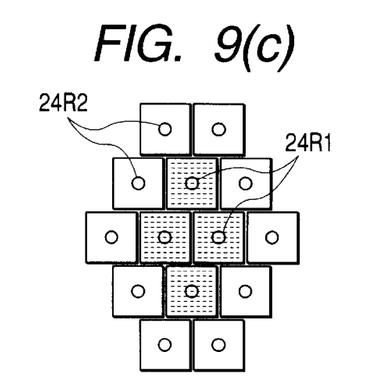
Figure 9D:
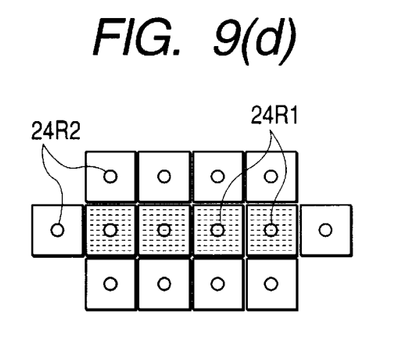
Figure 9E:
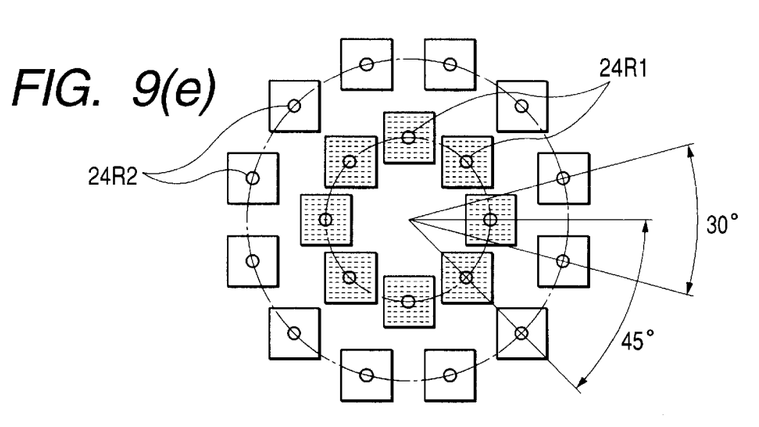

More specifically, FIG. 9(a) illustrates an embodiment of the present invention where four red LEDs 24R1 are disposed in the form of a square and 12 red LEDs 24R2 are disposed in the form of a square around the four red LEDs 24R1. FIG. 9(b) illustrates an embodiment of the present invention where five red LEDs 24R1 are disposed crosswise and where eight red LEDs 24R2 are disposed diamond-wise and stepwise. FIG. 9(c) illustrates an embodiment of the present invention where four red LEDs 24R1 are disposed vertically length-wise and substantially diamond-wise and 10 red LEDs 24R2 are disposed vertically length-wise, substantially diamond-wise and stepwise. FIG. 9(d) illustrates an embodiment of the present invention where four red LEDs 24R1 are horizontally lined up and where 10 red LEDs 24R2 are disposed around the four red LEDs 24R1. FIG. 9(e) illustrates an embodiment of the present invention where eight red LEDs 24R1 are disposed at 45° intervals on the same circumference and where 12 red LEDs 24R2 are disposed at 30° intervals around the eight red LEDs 24R2.

In each one of the exemplary arrangements described above, the plurality of red LEDs 24R1 are disposed in the central position of the light source 20A. The plurality of red LEDs 24R2 are disposed so as to surround the red LEDs 24R1. Thus, the light source 20A appears as if a single light source became luminous in any one of the lamp lighting modes wherein only the red LED 24R1 is turned on and wherein the red LEDs 24R1 and 24R2 are turned on (further, in the lamp lighting mode wherein only the red LEDs 24R2 (only the amber LEDs 32U of the light source 20B) are turned on). Moreover, since a plurality of red LEDs 24R1 are provided in each one of the exemplary arrangements above, a sufficient amount of light can be provided in the lamp lighting mode wherein only the red LED 24R1 is turned on.

In any one of the exemplary arrangements described above, the plurality of red LEDs 24R1 and 24R2 are disposed with geometric regularity and the light source 20A can be turned on as a single light source without incorrect indications. Even if any one of the exemplary arrangements above is made with in a geometric arrangement with some irregularities, it is possible to make the light source 20A look like a single light source to be turned on.

The above description describes a vehicle lamp 10 that is a rear combination lamp. The rear combination lamp is provided with a lamp unit 12A that is turned on in the tail lamp lighting mode and the stop lamp lighting mode. The rear combination lamp is also provided with a lamp unit 12B that is turned on in the tail lamp lighting mode and the turn-signal lamp lighting mode. According to the above-described embodiment of the present invention, however, the same effect can be achieved by making arrangements similar to those adopted herein in other kinds of vehicle lamps.

The foregoing description of an embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated.

What is claimed is:

1. A vehicle lamp comprising:

a lamp unit including a plurality of light sources having a plurality of LEDs that can be turned on in at least two kinds of lamp lighting modes;

each of said light sources being provided with a first LED group comprising at least one LED disposed in a substantially central position of said light source and a second LED group comprising a plurality of LEDs surrounding said first LED group, said first and said second LED groups being mutually exclusive; and said lamp lighting modes comprising a first lamp lighting mode wherein only said first LED groups of all of said light sources are turned on simultaneously, and a second lamp lighting mode wherein said second LED groups of all of said light sources are turned on.

2. The vehicle lamp as claimed in claim 1, wherein said first LED groups and said second LED groups comprise LEDs having substantially the same luminescent color and wherein said first and said second LED groups are simultaneously turned on in said second lamp lighting mode.

3. The vehicle lamp as claimed in claim 1, wherein each of said first LED groups comprises LEDs having a first luminescent color and each of said second LED groups comprises LEDs having a second luminescent color different from the first luminescent color, and wherein only said second LED groups are turned on in said second lamp lighting mode.

4. The vehicle lamp as claimed in claim 1, wherein said vehicle lamp is provided with a plurality of said lamp units which are set to have two kinds of lamp lighting modes different in combination between said lamp units.

5. The vehicle lamp as claimed in claim 1, wherein a diffusion lens comprising a plurality of diffusion lens elements is provided in front of said light sources.

6. The vehicle lamp as claimed in claim 5, wherein a condenser lens is provided in front of said diffusion lens.

7. The vehicle lamp as claimed in claim 6, wherein said condenser lens is a planoconvex lens that comprises a convex surface on a side facing away from said diffusion lens.

8. The vehicle lamp as claimed in claim 6, wherein said diffusion lens and said condenser lens are provided along an optical axis of said light source.

9. The vehicle lamp as claimed in claim 6, wherein a dome-shaped panel having an opening portion is provided in front of said condenser lens.

10. The vehicle lamp as claimed in claim 9, wherein said opening portion in said dome-shaped panel comprises a cylindrical portion extending towards said condenser lens.

11. The vehicle lamp as claimed in claim 10, wherein the inner peripheral surface of the cylindrical portion in said dome-shaped panel is provided with a half mirror portion.

12. A vehicle lamp comprising:

a lamp unit including a plurality of light source means having a plurality of LEDs that can be turned on in at least two kinds of lamp lighting modes;

each of said light source means being provided with a first LED group comprising at least one LED disposed in a substantially central position of said light source means and a second LED group comprising a plurality of LEDs surrounding said first LED group, said first and said second LED groups being mutually exclusive; and said lamp lighting modes comprising a first lamp lighting mode wherein only said first LED groups of all of said light source means are turned on simultaneously, and a second lamp lighting mode wherein said second LED groups of all of said light source means are turned on.

13. The vehicle lamp as claimed in claim 12, wherein said first LED groups and said second LED groups comprise LEDs having substantially the same luminescent color and wherein said first and said second LED groups are simultaneously turned on in said second lamp lighting mode.

14. The vehicle lamp as claimed in claim 12, wherein each of said first LED groups comprises LEDs having a first luminescent color and each of said second LED groups comprises LEDs having a second luminescent color different from the first luminescent color, and wherein only said second LED groups are turned on in said second lamp lighting mode.

15. The vehicle lamp as claimed in claim 12, wherein said vehicle lamp is provided with a plurality of said lamp source units which are set to have two kinds of lamp lighting modes different in combination between said lamp source units.

16. The vehicle lamp as claimed in claim 12, further comprising:

a diffusion lens provided in front of said light source means; and a condenser lens provided in front of said diffusion lens;

wherein said diffusion lens and said condenser lens are provided along an optical axis of said light source means.

17. A vehicle lamp having a plurality of lamp lighting modes, said vehicle lamp comprising:

a first light source being provided with a first LED group comprising at least one LED disposed in a substantially central position of said first light source and a second LED group comprising a plurality of LEDs surrounding said first LED group;

a second light source being provided with a third LED group comprising at least one LED disposed in a substantially central position of said second light source and a fourth LED group comprising a plurality of LEDs surrounding said third LED group; and said plurality of lamp lighting modes comprise a first lamp lighting mode wherein only said first and third LED groups are turned on, a second lamp lighting mode wherein said first and second LED groups are turned on, and a third lamp lighting mode where said third LED group is turned off and said fourth LED group is turned on intermittently.

18. The vehicle lamp as claimed in claim 17, wherein said first LED group and said second LED group comprise LEDs having substantially the same luminescent color.

19. The vehicle lamp as claimed in claim 17, wherein said first, second and third LED groups comprise LEDs having substantially the same luminescent color.

20. The vehicle lamp as claimed in claim 17, wherein said first LED group comprises LEDs having a first luminescent color and said fourth LED group comprises LEDs having a second luminescent color different from the first luminescent color.

* * * * *